United States Patent [19]

Mouri et al.

[11] Patent Number: 4,914,147

[45] Date of Patent: Apr. 3, 1990

[54] PNEUMATIC TIRES

[75] Inventors: Hiroshi Mouri; Hiromi Maeda, both of Kodaira, Japan

[73] Assignees: Bridgestone Corporation; Japan Synthetic Rubber Co., Ltd., both of Tokyo, Japan

[21] Appl. No.: 242,257

[22] Filed: Sep. 9, 1988

[30] Foreign Application Priority Data

Sep. 11, 1987 [JP] Japan ................................. 62-228017

[51] Int. Cl.$^4$ ........................... C08K 3/04; C08L 7/00; C08L 9/00; C08L 9/06
[52] U.S. Cl. ..................................... 524/495; 524/496; 525/193; 525/194; 525/195; 525/196; 525/237
[58] Field of Search ................ 524/495, 496; 525/193, 525/194, 195, 196, 237

[56] References Cited

U.S. PATENT DOCUMENTS

| | | | |
|---|---|---|---|
| 4,477,621 | 10/1984 | Sato et al. | 524/495 |
| 4,703,079 | 10/1987 | Ahmad et al. | 524/495 |
| 4,742,117 | 5/1988 | Tsutsumi et al. | 525/123 |
| 4,748,199 | 5/1988 | Takiguchi et al. | 524/495 |

FOREIGN PATENT DOCUMENTS 4838615 11/1973 Japan .
54-44315 12/1979 Japan .
56-82610 7/1981 Japan .

*Primary Examiner*—Allan M. Lieberman
*Attorney, Agent, or Firm*—Sughrue, Mion, Zinn, Macpeak & Seas

[57] ABSTRACT

A heavy duty pneumatic tire for use in construction vehicles, truck and bus is disclosed, which comprises a tread rubber having improved cut resistance, resistance to rib tear, wear resistance, resistance to heat build-up, processability and the like. The tread rubber comprises 20-100 parts by weight of a particular modified styrene-butadiene copolymer and 80-0 parts by weight of other diene series rubber as a rubber component and contains 40-80 parts by weight of a particular carbon black based on 100 parts by weight of the rubber component.

5 Claims, No Drawings

PNEUMATIC TIRES

BACKGROUND OF THE INVENTION

1. Field of the Invention

This invention relates to a rubber composition and a pneumatic tire comprising the rubber composition as a tread rubber and/or a sidewall rubber having improved tear resistance, cut resistance, wear resistance, resistance to heat build-up and processability.

2. Related Art Statement

In tires for construction vehicles used on mines and stone pits, and large size tires for heavy duty truck and bus frequently running on unpaved road, particularly bad road containing exposed rocks and stones, there is a frequent chance that the tread portion, sidewall portion and the like of these tires are subjected to cut damage by sharp protrusions of the ground stones, and finally the breakage of the tire is caused by the growth of the cut damage or by the corrosion of steel cords as a reinforcement with rain water or the like penetrated through the cut damage.

Therefore, it is desired that the tread portions of the tires for construction vehicle or the large size tires for heavy duty truck and bus are required to have cut resistance and chipping resistance as well as resistance to heat build-up, wear resistance and processability.

In general, it is known that when carbon black is compounded in a large amount as a means for enhancing the cut resistance of the rubber composition, the cut resistance is improved, the chipping resistance, the resistance to heat build-up or the kneading and extrusion operabilities are considerably poor.

As a means for improving the cut resistance in the starting rubber, Japanese Patent laid open No. 56-82,610 discloses the use of styrene-butadiene rubber having a bound styrene content of 35-55% by weight, and also Japanese Patent Application Publication No. 48-38,615 discloses the compounding of cyclopentadiene resin.

In the above conventional techniques, however, the cut resistance and chipping resistance can be improved, but there are still problems on the wear resistance and processability. Particularly, the heat build-up remarkably increases to undesirably cause the breakage of the tire at high temperature when any restriction is not given to the tire running at high speed under heavy load over a long distance.

Recently, with the advance of performances in the construction vehicle and ore and rubble carrying vehicle, it is demanded to improve not only the resistance to rib tear and chipping resistance but also the wear resistance and resistance to heat build-up in the tires for use in these vehicles.

SUMMARY OF THE INVENTION

It is, therefore, an object of the invention to provide a rubber composition and a pneumatic tire suitable for running on bad road which comprises such a rubber composition as a tread rubber and/or sidewall rubber having improved resistance to rib tear, chipping resistance, wear resistance on bad road and wear resistance while restraining the heat build-up as far as possible as regards the above performances required for the tire as well as an excellent processability.

According to the invention, there is the provision of a pneumatic tire, characterized in that at least tread portion of said tire is comprised of a rubber composition comprising 20-100 parts by weight of a modified styrene-butadiene copolymer and 80-0 parts by weight of other diene series rubber as a rubber component and containing 40-80 parts by weight of carbon black having a specific surface area of nitrogen adsorption of 110-160 m$^2$/g and a DBP oil absorption of 100-150 m/100 g based on 100 parts by weight of said rubber component; said modified styrene-butadiene copolymer being obtained by copolymerizing 15-50 parts by weight of styrene and 85-50 parts by weight of 1,3-butadiene in a hydrocarbon solvent in the presence of an organolithium polymerization initiator and then modifying an active end of the resulting polymer with a terminal modifying agent; said copolymerization being carried out by using (a) 0.01-0.5 mol of at least one anionic surfactant having —SO$_2$M or —OSO$_3$M group (wherein M is an element selected from Na, K, Rb and Cs) per 1 gram-atom of lithium in said organolithium polymerization initiator and (b) 0.1-5 mol of at least one of alcohols, thioalcohols, organic carboxylic acids, organic sulfonic acids, organic phosphites, primary amines and secondary amines based on 1 mol of said surfactant.

DESCRIPTION OF THE PREFERRED EMBODIMENTS

The rubber composition according to the invention contains the modified styrene-butadiene copolymer produced under the above defined conditions and the high reinforcing carbon black as an essential component, which is applied to the tread portion and/or the sidewall portion of the tire to achieve the object of the invention.

The rubber component used in the invention is obtained by copolymerizing 15-50 parts by weight of styrene with 85-50 parts by weight of 1,3-butadiene in the presence of an organolithium polymerization initiator.

The reason why the amount of styrene used is limited to 15-50 parts by weight is due to the fact that when the amount is less than 15 parts by weight, the cut resistance and the chipping resistance become poor, while when it exceeds 50 parts by weight, the heat build-up increases and the wear resistance lowers.

Further, since the energy loss of the copolymer becomes small as compared with that of the emulsion polymerized styrene-butadiene rubber, a cocatalyst consisting of an organolithium compound and a specific organometallic salt is used as a polymerization catalyst for obtaining a low heat build-up styrene-butadiene copolymer.

As the organolithium polymerization initiator used in the invention, mention may be made of alkyllithiums such as ethyllithium, propyllithium, n-butyllithium, sec-butyllithium, tert-butyllithium and the like; aryllithiums such as phenyllithim, tolyllithium and the like; alkenyllithiums such as vinyllithium., propenyllithium and the like; alkylene dilithiums such as tetramethylene dilithium, pentamethylene dilithium, hexamethylene dilithium, decamethylene dilithium and the like; arylene dilithiums such as 1,3-dilithio benzene, 1,4-dilithio benzene and the like; 1,3,5-trilithio cyclohexane, 1,2,5-trilithio naphthalene, 1,3,5,8-tetralithio decane, 1,2,3,5-tetralithio-4-hexyl-anthracene and so on. Among these compounds, n-butyllithium, sec-butyllithium, tertbutyllithium and tetramethylene dilithium are preferable, and particularly n-butyllithium is most preferable.

The amount of the organolithium polymerization initiator used is determined by the given polymerization rate in the reaction operation and the molecular weight of the resulting copolymer. In general, this initiator is used in an amount of about 0.02–5 milligram-atom, preferably 0.05–2 milligram-atom as a lithium atom per 100 g of the monomer.

The molecular weight of the modified styrene-butadiene copolymer used in the invention is not particularly restricted, but it preferably corresponds to 10–150 as a Mooney viscosity ($ML_{1+4}$, 100° C.).

The surfactant (a) having a —$SO_2M$ or —$OSO_3M$ group, which is used in the invention, is compounds disclosed in Japanese Patent Application Publication No. 54-44,315 such as potassium dodecylbenzenesulfonate, sodium dodecylbenzenesulfonate, potassium tetradecylbenzene-sulfonate, potassium hexadecylbenzenesulfonate, potassium octadecylbenzenesulfonate and the like.

The surfactant (a) having a or —$SO_2M$ or —$OSO_3M$ group is used in an amount of 0.01–0.5 mol per 1 gram-atom of lithium in the organolithium polymerization agent. When the amount is less than 0.01 mol, it is difficult to obtain a random styrene-butadiene copolymer, while when it exceeds 0.5 mol, the polymerization activity undesirably lowers.

As the compound (b) used together with the surfactant (a), mention may be made of aliphatic alcohols such as methyl alcohol, n-butyl alcohol, t-butyl alcohol, hexyl alcohol, 2-ethylhexyl alcohol n-octyl alcohol, lauryl alcohol and the like; various phenolic alcohol derivatives; primary and secondary amines such as butylamine, dibutylamine, hexylamine, dihexylamine, octylamine, dioctylamine, benzylamine, dibenzylamine, aniline and the like; thioalcohols such as butylmercaptan, octylmercaptan, dodecylmercaptan and the like; organic carboxylic acids such as octylic acid, stearic acid, hexanic acid and the like; organic phosphites and organic sulfonic acids. The compound (b) is used in an amount of 0.1–5 mol, preferably 0.5–1 mol per 1 mol of the surfactant (a). (The surfactant (a) having a —$SO_2M$ or —$OSO_3M$ group and the compound (b) can be mixed at a desirable temperature in form of solution.)

When the amount of the compound (b) is less than 0.1 mol per 1 mol of the surfactant (a), the randomization effect of styrene through the surfactant (a) becomes small, and the properties such as rebound resilience and the like are poor, while when it exceeds 5 mol, the polymerization activity through the organolithium polymerization initiator undesirably lowers.

As the hydrocarbon solvent, alicyclic hydrocarbons such as cyclohexane, methyl cyclopentane, cyclooctane and the like; aliphatic hydrocarbons such as propane, butane, pentane, hexane, heptane, octane, decane and the like; and aromatic hydrocarbons such as benzene, toluene, ethylbenzene and the like are used. These hydrocarbons may be used in admixture of two or more hydrocarbons. Among these hydrocarbons, the aliphatic and alicyclic hydrocarbons are preferable as a polymerization catalyst. This hydrocarbon solvent is used in an amount of 0.5–20 parts by weight per 1 part by weight of the monomer.

The average vinyl content in the modified styrene-butadiene copolymer used in the invention is not particularly restricted. In order to obtain the copolymer having a high vinyl content, the well-known Lewis base such as ether, tertiary amine or the like may be used.

According to the invention: the modified styrene-butadiene copolymer is preferred to have a bound styrene content of 15–50% by weight and a ratio of $\overline{Mw}/\overline{Mn}$ of 1.8–3.0. Furthermore, the reaction efficiency of the terminal modifying agent is preferably within a range of 25–70%. Moreover, the copolymer is preferably a random copolymer in which the block polystyrene content is less than 5% of the bound styrene content in the molecular chain of the copolymer. When the modified styrene-butadiene copolymer usually has a Mw (weight-average molecular weight) of 300,000–750,000, it is advantageously used in the tread rubber of the pneumatic tire. The production of such a styrene-butadiene copolymer includes a method of producing so-called random styrene-butadiene copolymer that styrene blocks are formed at the completion of the polymerization.

The block polystyrene content is measured according to a method described by I. M. Kolthoff [J. Polymer Sci. vol. 1, 429 (1946)].

The polymerization reaction for obtaining the polymer used in the invention may be a batch polymerization system or a continuous polymerization system.

The polymerization temperature is within a range of 0° C.–130° C.

Furthermore, the polymerization may be carried out by an isothermic polymerization process, a temperature rising polymerization process or an adiabatic polymerization process.

And also, an allene compound such as 1,2-butadiene or the like may be added for preventing the occurrence of gel inside the reaction vessel during the polymerization.

After the copolymerization, the terminal of the resulting styrene-butadiene copolymer is modified by adding the terminal modifying agent as mentioned below. By such a terminal modification, styrene-butadiene copolymers having excellent properties and processability can be obtained as compared with SBR modified at its terminal with Lewis base or t-BuOK as a randomizing agent in the usual manner.

As the terminal modifying agent, mention may be made of alkenyl aromatic vinyl compounds such as divinyl benzene, diisopropenyl benzene and the like; halogenated tin compounds such as tin tetrachloride, dibutyltin dichloride, tributyltin chloride, triphenyltin chloride and the like; halogenated silicon compounds such as silicon tetrachloride, butyl trichlorosilicon, methyl trichlorosilicon and the like; -isocyanate compounds such as phenyl isocyanate, 2,4-tolylene diisocyanate, 2,6-tolylene diisocyanate, diphenylmethane diisocyanate, polymeric-type diphenylmethane diisocyanate, isophorone diisocyanate, hexamethylene diisocyanate and the like; dialkylamino-substituted aromatic vinyl compounds such as N,N'-dimethylamino benzophenone, N,N'-diethylamino benzophenone, N-dimethylamino benzaldehyde, N-diethylamino benzaldehyde, N-dimethylamino benzoyl chloride, methyl ester of N-dimethylamino benzoic acid, p-diethylamino styrene, p-dimethylaminomethyl styrene, 1-(N-dimethylamino)-4-chlorobenzene and the like; nitrogen-containing aromatic heterocompounds such as 4-vinylviridine, 2-vinylviridine, bis (2-viridyl) ketone, bis (4-viridyl) ketone and the like; and cyclic urea compounds such as 1,3-diethyl-2-imidazolidinone, 1,3-dimethyl-2-imidazolidinone and the like. Among these compounds, one or more modifying agents are selected and added to the polymerization system to thereby modify the active terminal of the copolymer.

The structure of the styrene-butadiene copolymer to be bonded with the terminal modifying agent is not particularly restricted, but it is preferable to bond the terminal modifying agent to diene monomer portion in the molecule of the styrene-butadiene copolymer. For this purpose, a small amount of diene monomer may be added to the polymerization system before the addition of the terminal modifying agent, whereby such a monomer can be bonded to the terminal of the styrene-butadiene copolymer.

According to the invention, the rubber component is formed by compounding 20-100 parts by weight of the above modified styrene-butadiene copolymer with 80-0 parts by weight of one or more of the other diene series rubbers such as natural rubber, synthetic polyisoprene rubber, emulsion-polymerized styrene butadiene rubber and polybutadiene rubber. The reason why the amount of the modified styrene-butadiene copolymer is limited to not less than 20 parts by weight is due to the fact that when the amount is less than 20 parts by weight, the effect of improving the performances of the tire is less.

The carbon black to be compounded with the above rubber component has a specific surface area of nitrogen adsorption of 110-160 m$^2$/g and a DBP oil absorption of 100-150 ml/100 g and is used in an amount of 40-80 parts by weight based on 100 parts by weight of the rubber component. The characteristics of the carbon black correspond to SAF and ISAF grades. If the characteristics of carbon black correspond to HAF grade, the wear resistance and resistance to rib tear in tires for truck and bus and the wear resistance on bad road and cut resistance in tires for construction vehicle are poor.

When the amount of carbon black is less than 40 parts by weight based on 100 parts by weight of the rubber component, the wear resistance and resistance to rib tear as well as the wear resistance on bad road and cut resistance are poor, while when it exceeds 80 parts by weight, the heat build-up becomes large and the durability lowers.

The following examples are given in illustration of the invention and are not intended as limitations thereof.

EXAMPLES 1-4, COMPARATIVE EXAMPLES 1-10

2,000 g of dehydrated and deaerated cyclohexane was mixed with 350 g of 1,3-butadiene, 150 g of styrene and 0.2 g of tetrahydrofuran, added with 0.4 millimol as a potassium compound of a complex of potassium dodecylbenzene sulfonate and 2-ethylhexyl alcohol having a mol ratio of 1:0.5 and 5 millimol of n-butyllithium and then polymerized under temperature rising of 50°-100° C.

After the completion of the polymerization, 4 millimol of diphenylmethane diisocyanate having two or more isocyanate groups in one molecule was added to conduct the coupling reaction. Thereafter, 6 millimol of 2-ethylhexyl alcohol was added and then desolvation drying was carried out in the usual manner to obtain a polymer.

The resulting polymer had a bound styrene content of 30%, a vinyl content in butadiene portion of 18%, a block polystyrene content in polymer of 0%, a Mooney viscosity ($ML_{1+4}$, 100° C.) of 66, and $\overline{M}w/\overline{m}n$ of 2.0.

Assuming that the above polymer was a polymer according to the invention, a tread rubber was prepared according to a compounding recipe as shown in the following Tables 1 and 2 and applied to a tread portion of a radial tire for truck and bus having a tire size of 10.00 R20.

The tire performances of test tire having a rib tread pattern were measured on good road to obtain results as shown in Table 1, while the tire performances of test tie for use in construction vehicle having a lug tread pattern were measured on bad road to obtain results as shown in Table 2.

Moreover, the test methods were as follows.

(1) Heat Generating Temperature

After the test tire was run on a drum of 6 m in diameter at a speed of 60 km/hr under an internal pressure of 7.25 kg/cm$^2$ and a 100% JIS load for 1 hour, the temperature inside the tread (a portion ranging inward from tread surface to 15 cm) was measured.

(2) Wear Resistance on Bad Road

The test tire was attached to a heavy load truck and actually run at a speed of 50 km/hr under 100% load on rubble-scattered bad road having curves and various gradients in a distance of 1.2-3.4 km in dam construction site or stone pit for 1,200 hours. Then, the worn amounts of tread surface portion at a predetermined positions (inclusive of wear due to cut) were measured, from which an average value was calculated. The property was represented by an index on the basis that Comparative Example 7 was 100.

(3) Cut Resistance

During the running under the same conditions as in the above item (2), the number of cut damages produced in the tread surface portion over a whole circumference of the tire and the depth thereof were measured at middle and last running lives of the tire, from which the occurrence state of the cut failure was represented by three lanks, i.e. A (no occurrence, disregarding depth of less than 5 mm), B (less than 5 cuts per block) and C (not less than 5 cuts per block).

(4) Wear Resistance

After the running over a distance of about 50,000 km, a distance capable of running until the groove depth reduced by 1 mm (running distance per 1 mm) was calculated from the remaining groove depth in the pattern of the tread rubber. Then, the wear resistance was represented by the following equation:

$$\frac{\text{Running distance of test tire per 1 mm}}{\text{Running distance of Comparative Example 1 or Comparative Example 7}} \times 100$$

(5) Resistance to Rib Tear

The tread surface of the tire used in the above item (4) was visually observed over the whole circumference thereof. The property was represented by three lanks,i.e. A (no occurrence of rib tear), B (total length of rib tear being less than 5% of the circumferential length of the tread) and C (total length of rib tear being not less than 5% of the circumferential length of the tread).

TABLE 1

|  |  | Example | | Comparative Example | | | | | |
|---|---|---|---|---|---|---|---|---|---|
|  |  | 1 | 2 | 1 | 2 | 3 | 4 | 5 | 6 |
| Blending ratio of rubbers (part by weight) | natural rubber | 60 | 70 | 60 | 70 | 60 | 60 | 60 | 60 |
|  | polymer according to the invention | 40 | 30 |  |  | 40 | 40 | 40 |  |
|  | emulsion polymerized SBR100 |  |  | 40 | 30 |  |  |  |  |
|  | unmodified S01~SBR* |  |  |  |  |  |  |  | 40 |
| Amount of carbon black (parts by weight per 100 parts by weight of rubber) | carbon black SAF | 50 | 50 | 50 | 50 | 35 | 85 |  | 50 |
|  | carbon black HAF |  |  |  |  |  |  | 50 |  |
| Properties of rubber composition | tensile strength (kgf/cm²) | 285 | 287 | 278 | 275 | 205 | 235 | 248 | 286 |
|  |  | 175 | 205 | 175 | 208 | 111 | 135 | 155 | 176 |
|  | elongation (%) | 571 | 598 | 582 | 602 | 723 | 405 | 608 | 553 |
|  |  | 635 | 658 | 621 | 633 | 785 | 411 | 644 | 595 |
|  | rebound resilience (%) | 46 | 45 | 41 | 42 | 50 | 37 | 48 | 45 |
|  | wear resistance | 110 | 103 | 100 | 98 | 66 | 112 | 72 | 95 |
| Tire performances | heat generating temperature (°C.) | 96 | 97 | 110 | 108 | 92 | 121 | 93 | 97 |
|  | wear resistance | 115 | 108 | 100 | 99 | 58 | 105 | 68 | 93 |
|  | cut resistance | A | A | A~B | A~B | C | C | C | C |

*Polymerization was carried out by the same manner as in the polymer according to the invention, but the terminal end of molecular chain was not modified by coupling reaction.

Compounding recipe

| | part by weight |
|---|---|
| polymer | 100 |
| stearic acid | 2 |
| antioxidant 810NA | 1 |
| zinc white | 3 |
| vulcanization accelerator | |
| TP | 0.8 |
| DPG | 0.6 |
| DM | 1.2 |
| sulfur | 1.5 |

TABLE 2

|  |  | Example | | Comparative Example | | | |
|---|---|---|---|---|---|---|---|
|  |  | 3 | 4 | 7 | 8 | 9 | 10 |
| Blending ratio of rubbers (part by weight) | polymer according to the invention | 100 | 50 |  | 50 | 50 | 50 |
|  | emulsion polymerized SBR1500 |  | 50 | 100 | 50 | 50 | 50 |
| Amount of carbon black (parts by weight per 100 parts by weight of rubber) | carbon black SAF | 50 | 50 | 50 | 35 | 85 |  |
|  | carbon black HAF |  |  |  |  |  | 50 |
| Properties of rubber composition | tensile strength (kgf/cm²) | 249 | 245 | 248 | 175 | 211 | 235 |
|  |  | 120 | 124 | 115 | 72 | 83 | 101 |
|  | elongation (%) | 601 | 589 | 598 | 721 | 301 | 623 |
|  |  | 501 | 483 | 423 | 611 | 323 | 435 |
|  | rebound resilience (%) | 44 | 40 | 36 | 48 | 30 | 44 |
|  | wear resistance | 101 | 105 | 100 | 65 | 90 | 71 |
|  | cut resistance | 110 | 135 | 100 | 51 | 120 | 62 |
| Tire performances | heat generating temperature (°C.) | 94 | 98 | 105 | 93 | 115 | 95 |
|  | wear resistance on bad road | 127 | 144 | 100 | 68 | 105 | 89 |
|  | cut resistance | A | A | B | C | A~B | C |

Compounding recipe

| | part by weight |
|---|---|
| polymer | 100 |
| stearic acid | 2 |
| antioxidant 810NA | 1 |
| zinc white | 3 |
| vulcanization accelerator | |
| TP | 0.8 |
| DPG | 0.4 |
| DM | 0.8 |
| sulfur | 1.5 |

As seen from Tables 1 and 2, the balance of the performances is excellent in the tires according to the invention as compared with the tires of Comparative Examples.

As mentioned above, the invention can provide pneumatic tires having a tread rubber with excellent resistance to heat build-up, resistance to rib tear, chipping resistance, wear resistance on bad road, wear resistance, rebound resilience and processability, which are suitable for use in vehicles running on bad roads such as mines, stone pits, unpaved road surface and the like.

What is claimed is:

1. A pneumatic tire, characterized in that at least a tread portion of said tire is comprised of a rubber composition comprising 20-100 parts by weight of a modified styrene-butadiene copolymer and 80-0 parts by weight of another diene series rubber as a rubber component, and containing 40-80 parts by weight of carbon black having a specific surface area of nitrogen adsorption of 110-160 m²/g and a DBP oil absorption of 100-150 ml/100 g based on 100 parts by weight of said rubber component; wherein said modified styrene-butadiene copolymer is obtained by copolymerizing 15-50 parts by weight of stryrene and 85-50 parts by weight of 1,3-butadiene in a hydrocarbon solvent in the presence of an organolithium polymerization initiator and then modifying an active end of the resulting polymer with a terminal modifying agent; said copolymerization being carried out by using (a) 0.01-0.5 mol of at least one anionic surfacant having a —SO₂M or —O-SO₃M group (wherein M is an element selected form the group consisting of Na, K, Rb and Cs), per 1 gram-atom of lithium in said organolithium polymerization initiator and (b) 0.1-5 mol of at least one member selected form the group consisting of alcohols, thioalcohols, organic carboxylic acids, organic sulfonic acids, organic phosphites, primary amines and secondary amines, based on 1 mol of said surfacant, wherein said hydrocarbon solvent is used in an amount of 0.5-20 parts by weight per 1 part by weight of monomer, wherein said organolithium polymerization initiator is used in an amount of 0.02-5 milligram-atom as a lithium atom per 100 g of monomer, and wherein said terminal modifying agent is selected from the group consisting of alkenyl aromatic vinyl compounds, halogenated tim compounds, halogenated silicon compounds, isocyanate compounds, dialkylamino-substituted aromatic vinyl compounds, nitrogen-containing aromatic heterocompounds and cyclic urea compounds.

2. The pneumatic tire according to claim 1, wherein said organolithium polymerization initiator is selected from the group consisting of alkyllithiums, aryllithiums, alkenyllithiums, alkylene dilithiums, arylene dilithiums, 1,3,5-trilithio cyclohexane, 1,2,5-trilithio naphthalene, 1,3,5,8-tetralithio decane, and 1,2,3,5-tetralithio-4-hexylanthracene.

3. The pneumatic tire according to claim 1, wherein said surfactant (a) is selected from the group consisting of potassium dodecylbenzenesulfonate, sodium dodecylbenzenesulfonate, potassium tetradecylbenzenesulfonate, potassium hexadecylbenzenesulfonate and potassium octadecylbenzenesulfonate.

4. The pneumatic tire according to claim 1, wherein said copolymerization is carried out at a temperature of 0°-130° C.

5. A rubber composition 20-100 parts by weight of a modified styrene-butadiene copolymer and 80-0 part by weight of another diene series rubber as a rubber component, and containing 40-80 parts by weight of carbon black having a specific surface area of nitrogen adsorption of 110-160 m²/g and a DBP oil absorption of 110-150 ml/100 g based on 100 parts by weight of said rubber component; wherein said modified styrene-butadiene copolymer is obtained by copolymerizing 15-50 parts by weight of stryrene and 85-50 parts by weight of 1,3-butadiene in a hydrocarbon solvent in the presence of an organolithium polymerization initiator and then modifying an active end of the resulting polymer with a terminal modifying agent; said copolymerization being carried out by using (a) 0.01-0.5 mol of at least one anionic surfacant having a —SO₂M or —O-SO₃M group (wherein M is an element selected from the group consisting of Na, K Rb and Cs), per 1 gram-atom lithium in said organolithium polymerization initiator and (b) 0.1-5 mol of at least one member selected from the group consisting of alcohols, thioalcohols, organic carboxylic acids, organic sulfonic acids, organic phosphites; primary amines and secondary amines, based on 1 mol of said surfactant, wherein said hydrocarbon solvent is used in an amount of 0.5-20 parts by weight per 1 part by weight of monomer, wherein said organolithium polymerization initiator is used in an amount of 0.02-5 milligram-atom as a lithium atom per 100 g of monomer, and wherein said terminal modifying agent is selected from the group consisting of alkenyl aromatic vinyl compounds, halogenated tin compound, halogenated silicon compounds, isocyanate compounds, dialkylamino-substituted aromatic vinyl compounds, nitrogen-containing aromatic heterocompounds and cyclic urea compounds.

* * * * *